Patented Jan. 25, 1949

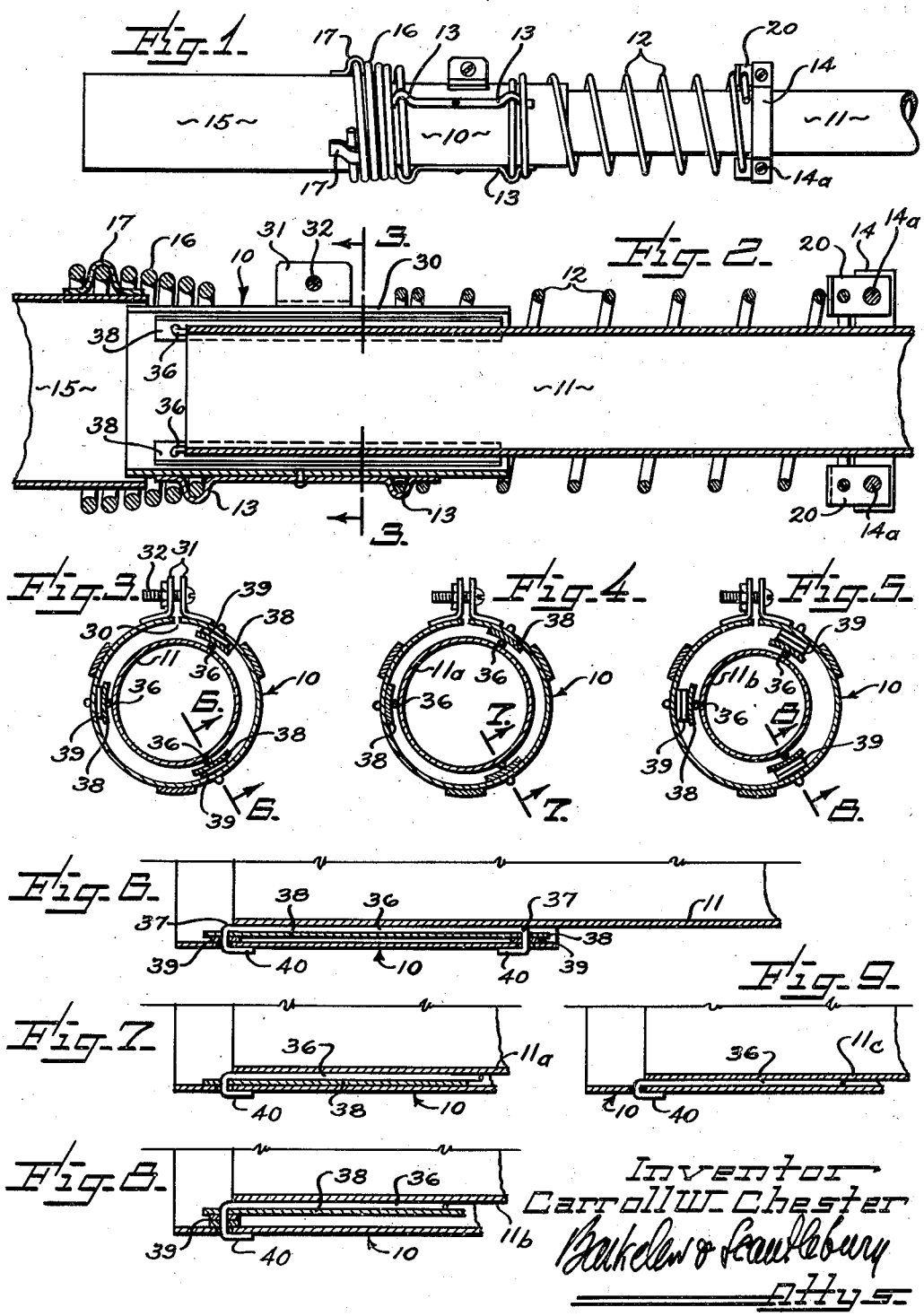

2,459,918

UNITED STATES PATENT OFFICE 2,459,918

SIZE ADAPTION FOR AUTOMOBILE EXHAUST PIPE EXTENSIONS AND THE LIKE

Carroll W. Chester, Los Angeles, Calif.

Application August 28, 1947, Serial No. 771,032

5 Claims. (Cl. 285—198)

This invention relates generally to size adaption systems, and more particularly to adapter devices and systems suitable for use in adapter exhaust pipe extensions to automobile exhaust or tail pipes of different sizes. The invention is particularly effective in that use, and the illustrative form of the invention which will be hereinafter described has been designed with that particular use in view. But the invention is not limited to that use, as it has utility wherever a tubular member of standardized size is to be fitted onto other parts which may very in size.

In my previous applications, Ser. 584,309, filed March 23, 1945, and Ser. 667,615, filed May 6, 1946, I have described an exhaust pipe extension which, when mounted upon the exhaust pipe, has the function of continuing the pipe to a point located rearwardly of the rearmost parts of an automobile structure, usually the rear bumper. That exhaust pipe extension, to avoid being injured by reason of its extension beyond the bumper, is laterally flexible and is capable of being resiliently compressed longitudinally of the exhaust pipe so that it may move forward on the pipe. In a preferred design, the structure involves a tubular member which is slidingly fitted to the exhaust pipe and is equipped with spring means for resisting its forward sliding movement. Exhaust pipes vary in diameter in various automobiles; and it is a specific and particular objective of the present invention to provide a simple and easily applied size adaption to that sliding tube to make it easily fitted to exhaust pipes of different diameters.

The following detailed specification will describe preferred embodiments of my present invention, with reference to the accompanying drawings in which Fig. 1 is an elevation showing my typical extension mounted upon a typical exhaust pipe;

Fig. 2 is an enlarged longitudinal section of portions of Fig. 1;

Fig. 3 is a cross section on line 3—3 of Fig. 2 showing one arrangement of the adaption members;

Figs. 4 and 5 are similar cross sections showing other arrangements of the size adaption members and Figs. 6, 7 and 8 are fragmentary sections taken as indicated by lines 6—6 on Fig. 3, 7—7 on Fig. 4, and 8—8 on Fig. 5, and Fig. 9 is another fragmentary longitudinal section similar to Figs. 6, 7 and 8 showing another arrangement of the size adapter members.

As illustrated in the drawing the exhaust pipe extension includes a tubular member 10 which is slidingly mounted on the exhaust pipe 11, preferably in a relative position where the rear end of tubular member 10 projects somewhat beyond the rear end of the pipe. A compression spring 12 has its rear end secured to tubes 10 by suitable clips 13, and has its forward end connected to a clamp 14 which is tightly clamped on the exhaust pipe. With clamp 14 properly placed, tube 10 normally stands in about the relative positive illustrated when spring 12 is unstressed.

An extension tube 15, preferably somewhat larger than tube 10, extends rearwardly from tube 10 and is structurally connected to that tube by a spring 16. The spring is connected to tube 15 by suitable clips 17 and to tube 10 by the clips 13. Preferably spring 16 is coiled in conical formation as illustrated and has its coils in close intercontact when the spring is unstressed. The spring thus forms a non-compressible connection between extension tube 15 and sliding tube 10, but at the same time forms a laterally flexible connection which allows extension tube 15 to yield laterally if it is subjected to any lateral forces. If the extension tube is backed into any obstruction, it moves forwardly, sliding tube 10 forwardly along the exhaust pipe and spring 12 is compressed. On relief from the applied force, spring 12 expands and restores the parts to their normal position. To prevent injury to spring 12, or to spring 16, by tensile stresses which might result if the real part of the extension be caught on any object when the automobile is moving forwardly, spring 12 is connected with clamp 14 through two small breakable tabs 20 which may typically be made of sheet copper. The rearmost coil of spring 12 passes through both these tabs and the tabs have holes through which the clamping bolts 14a of the clamp extend. Upon any rearward pull applied to spring 12, the tabs are designed to rupture and release the spring before any permanently distorting force is applied to the spring, or before any harmful force is applied to the exhaust pipe.

Automobile tail pipes now in use vary considerably in diameter, the present and commonly used size varying from 1½" to 2" in ⅛" steps. In the preferred form of my size adaption, sliding tube 10 is made of an internal diameter to directly fit upon a 2" tail pipe. Tube 10 may be made as a solid tube; but preferably it is slit longitudinally at 30 and provided with two tabs 31 to which a screw 32 is applied for small size adjustments of the tube so as to adjust to a nice sliding fit upon the tail pipe to allow it slide freely but to have no looseness.

Figs. 2, 3 and 6 show the tube fitted to a considerably smaller tail pipe—one of about 1⅝" diameter. The tube is provided with three sets of longitudinally spaced small holes 35, two of which are shown in Fig. 6. A bent wire 36, of about 1/16" diameter, has bent ends 37 which pass first through holes in the ends of metal strips 38, and then pass through one or more spacing washers 39 which lie directly against the inner surface of tube 10. One such washer 39 is shown in the figures now being referred to. The final ends of wires 36 are bent, as shown at 40, over the exterior surface of tube 10 to hold all of the parts in place. The combination of a wire, metal strip and the washers forms a size adaption liner for fitting the smaller sized tail pipe. The wires 36 themselves bear upon the tail pipe, and clamp screw 32 allows for small adjustments to make the fit a close but sliding one.

Figs. 4 and 7 show another arrangement, for fitting a somewhat larger tail pipe 11a, and wherein only the wires 36 and the metal strips 38 are used. The metal strips have a camber to fit closely to the inner surface of tube 10 as illustrated. Figs. 5 and 8 show an arrangement wherein two spaced washers 39 are placed behind each metal strip 38, thus holding the wires 36 further inwardly and adapting the device to fit a smaller tail pipe than that shown in Figs. 2 and 3. Fig. 9 shows the arrangement wherein only the wires 36 are used, to adapt the device to a tail pipe 11c of a size larger than that shown at 11a in Figs. 4 and 7. For a still larger tail pipe it has been described how tube 10 can be directly fitted to the pipe without using any of the adapter parts. For a tail pipe smaller than that which can be accommodated by using a plurality of washers 39 as shown in Figs. 5 and 8, instead of using a larger number of the spacing washers, it may in some instances be advisable to build up the external diameter of the tail pipe itself. This can easily be done by choosing a piece of tubing of proper internal and external diameters, long enough to encase the tail pipe from the position of clamp 14 to its rear end. Such a tube may then be easily secured to the tail pipe by slitting its forward end with several longitudinal slits and then clamping the slit forward end around the tail pipe in the clamp 14.

The following claims are directed to my size adaption system regardless of the nature or use of the pipes or tubes. The exhaust pipe extension herein described is the subject matter of the claims of my previously mentioned co-pending applications.

I claim:

1. An adaption system for fitting a tube to a pipe or the like, said system comprising a size adjusting clamp applied to the tube which is longitudinally slitted to allow of small size adjustments, and a series of removable and replaceable shimming units spaced around the inner surface of the tube; each of said shimming units including a wire extending longitudinally of the tube and having its ends bent and passing through holes in the tube wall.

2. An adaption system for fitting a tube to a pipe or the like, said system comprising a size adjusting clamp applied to the tube which is longitudinally slitted to allow of small size adjustments, and a series of removable and replaceable shimming units spaced around the inner surface of the tube, each of said shimming units including a wire extending longitudinally of the tube and having its ends bent and passing through holes in the tube wall, and including also a substantially flat strip extending longitudinally of the tube, lying between the tube wall and the longitudinal part of the wire and having holes through its ends through which the bent end portions of the wire pass.

3. An adaption system for fitting a tube to a pipe or the like, said system comprising a size adjusting clamp applied to the tube which is longitudinally slitted to allow of small size adjustments, and a series of removable and replaceable shimming units spaced around the inner surface of the tube, each of said shimming units including a wire extending longitudinally of the tube and having its ends bent and passing through holes in the tube wall, a substantially flat strip extending longitudinally of the tube, lying between the tube wall and the longitudinal part of the wire and in contact with the latter, said strip having holes through its ends through which the bent end portions of the wire pass, and spacing washers surrounding the bent end portions of the wire and lying between the strip and the tube wall.

4. An adaption system for fitting a tube to a pipe or the like, said system comprising a series of shimming units spaced around the inner surface of the tube, each said shimming unit including a wire extending longitudinally of the tube and having its ends bent and passing through holes in the tube wall, and including also a substantially flat strip extending longitudinally of the tube, lying between the tube wall and the longitudinal part of the wire and in contact with the latter, and having holes through its ends through which the bent end portions of the wire pass.

5. An adaption system for fitting a tube to a pipe or the like, said system comprising a series of shimming units spaced around the inner surface of the tube, each said shimming unit including a wire extending longitudinally of the tube and having its ends bent and passing through holes in the tube wall, a substantially flat strip extending longitudinally of the tube, lying between the tube wall and the longitudinal part of the wire and in contact with the latter, and having holes through its ends through which the bent end portions of the wire pass, and including also spacing washers surrounding the bent end portions of the wires and lying between the strips and the tube wall.

CARROLL W. CHESTER.

REFERENCES CITED

The following references are of record in the file of this patent:

UNITED STATES PATENTS

| Number | Name | Date |
| --- | --- | --- |
| 1,974,813 | Grawoig | Sept. 25, 1934 |